(12) United States Patent  
Liu (10) Patent No.: US 7,674,129 B1  
(45) Date of Patent: Mar. 9, 2010

(54) CLAMPING DEVICE FOR DIN RAIL

(75) Inventor: Chih Hsiung Liu, Taipei (TW)

(73) Assignee: Moxa Inc., Taipei (TW)

( * ) Notice: Subject to any disclaimer, the term of this patent is extended or adjusted under 35 U.S.C. 154(b) by 0 days.

(21) Appl. No.: 12/318,070

(22) Filed: Dec. 22, 2008

(51) Int. Cl.  
*H01R 9/26* (2006.01)

(52) U.S. Cl. .................. 439/532; 439/716; 361/807

(58) Field of Classification Search ............ 439/532, 439/716, 717; 361/807  
See application file for complete search history.

(56) References Cited

U.S. PATENT DOCUMENTS 5,704,805 A * 1/1998 Douty et al. ............... 439/532
2006/0175489 A1 * 8/2006 Portal ....................... 248/215
2006/0228950 A1 * 10/2006 Jamaleddin et al. ......... 439/709
2008/0108248 A1 * 5/2008 Lim et al. .................. 439/532

* cited by examiner

*Primary Examiner*—Gary F. Paumen  
(74) *Attorney, Agent, or Firm*—Bacon & Thomas, PLLC (57) ABSTRACT

A clamping device for a DIN rail is provided, in which a positioning blade spring is fixed on a base, a first positioning component and a second positioning component are disposed on a sliding element, and the sliding element moves relative to the base, so that the positioning blade spring is enabled to move from the second positioning component to the first positioning component for being fixed and positioned, so as to solve the problems of the prior art that the clamping device cannot be easily detached from the DIN rail and is easily damaged, thereby achieving the technique efficacies of simplifying the process of detaching the clamping device from the DIN rail and facilitating detaching the clamping device.

14 Claims, 7 Drawing Sheets

CLAMPING DEVICE FOR DIN RAIL

BACKGROUND OF THE INVENTION

1. Field of the Invention

The present invention relates to a clamping device, and more particularly to a clamping device having a positioning blade spring for positioning a sliding element between two positioning components.

2. Related Art

Generally, DIN rails have been widely applied to system equipments and various cases. To fix various electronic devices (such as a power supply) to the DIN rail detachably, the body of the removable electronic device is often provided with a clamping device, so that the electronic device can be easily fixed to the DIN rail with the aid of the clamping device.

Besides the clamping device disposed on the body of the electronic device, a clamping device clamped on the DIN rail may be further designed, so as to be used together with different removable electronic devices, so that various electronic devices are enabled to be applied on the DIN rail.

Currently, most of the clamping devices for DIN rails are configured into reciprocating structures, i.e., the clamping devices for DIN rails are clamped and fixed to the DIN rails through an elastic recovery force of elastic elements (i.e., a clamping force for clamping and fixing to the DIN rails). This design enables the clamping devices to be fixed on the DIN rails steadily.

However, the current clamping devices for DIN rails in a reciprocating structure lack of an effective detaching positioning design, i.e., the user cannot get to know whether the reciprocating clamping device can be detached from the DIN rail or not. When the user needs to detach the reciprocating clamping device from the DIN rail, since the reciprocating clamping device is clamped to the DIN rail through the clamping force produced by the elastic element, the user has to overcome the clamping force produced by the elastic element with one hand, and detach the clamping device with the other hand. During detaching, the user cannot apparently recognize whether the reciprocating clamping device can be detached from the DIN rail or not merely with naked eyes, which is quite disadvantageous for the user to operate when detaching.

In addition, if the force provided is not sufficient for overcoming the clamping force of the elastic element, the user cannot recognize whether the clamping device can be detached from the DIN rail or not, and if the clamping device is detached from the DIN rail by force, it may possibly damage the clamping device, or damage the DIN rail, which are problems of the current clamping device.

To sum up, the problems that the clamping device cannot be easily detached from the DIN rail and is easily damaged have been existed in the prior art for a long time, so that it's necessary to bring forward an enhanced technique to solve such problems.

SUMMARY OF THE INVENTION

In view of the problems of the prior art that the clamping device cannot be easily detached from the DIN rail and is easily damaged, the present invention is directed to a clamping device for a DIN rail.

The clamping device for the DIN rail provided in the present invention is adapted to be fixed to the DIN rail having a first slide rail and a second slide rail, and the clamping device includes a base, an elastic element, a positioning blade spring, and a sliding element.

The base is provided with at least one first buckling component, a receiving recess, at least one base positioning component. The first buckling components are buckled to the first slide rail. The elastic element is allocated in the receiving recess. The positioning blade spring has a spring positioning component and is fixed on the base. The sliding element has an inward depressed component. A bottom surface of the depressed component is provided with a support component and a positioning hole. A first positioning component and a second positioning component are disposed at the positioning hole, and the depressed component is provided with at least one second buckling component and at least one fitting component externally. The fitting component has a slide groove. The second buckling components are buckled to the second slide rail.

When the sliding element is positioned on the base, the fitting components are positioned corresponding to the base positioning components, the spring positioning component is positioned corresponding to the second positioning component, the elastic element bears against the support component to produce a clamping force, and the sliding element slides relative to the base through the slide groove. Once the sliding element slides relative to the base, the spring positioning component moves from the second positioning component to the first positioning component for being positioned.

The system and method of the present invention have been described above. The difference between the present invention and the prior art lies in that, by means of fixing the positioning blade spring on the base, providing the first positioning component and the second positioning component on the sliding element, and moving the sliding element relative to the base, the positioning blade spring is enabled to move from the second positioning component to the first positioning component in the present invention, such that the user can get to know that the clamping device is disengaged with the DIN rail completely, i.e., the clamping device can be detached from the DIN rail, thereby simplifying the detaching process and being helpful for the user to detach the clamping device from the DIN rail.

With the technique means described above, the present invention achieves the technique efficacies of simplifying the process of detaching the clamping device from the DIN rail and facilitating detaching the clamping device.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings.

Figure 1:
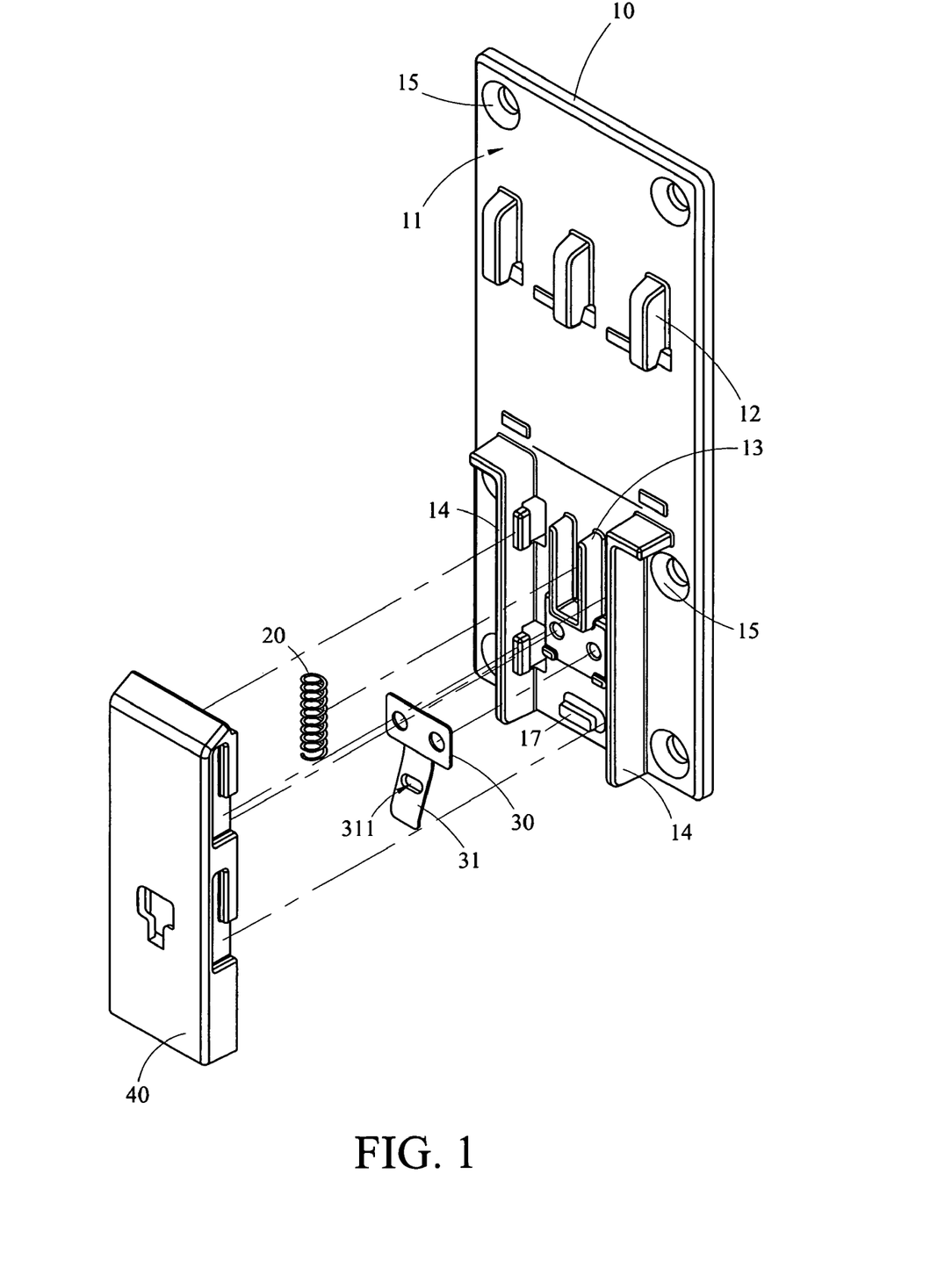
FIG. 1 is a three-dimensional exploded view of a clamping device for a DIN rail according to the present invention.

The clamping device for a DIN rail according to the present invention is described below. FIG. 1 is a three-dimensional exploded view of a clamping device for a DIN rail according to the present invention.

A clamping device for a DIN rail of the present invention is adapted to be fixed to a DIN rail (not shown in FIG. 1) having a first slide rail and a second slide rail, and the clamping device includes a base 10, an elastic element 20, a positioning blade spring 30, and a sliding element 40.

Figure 2A:
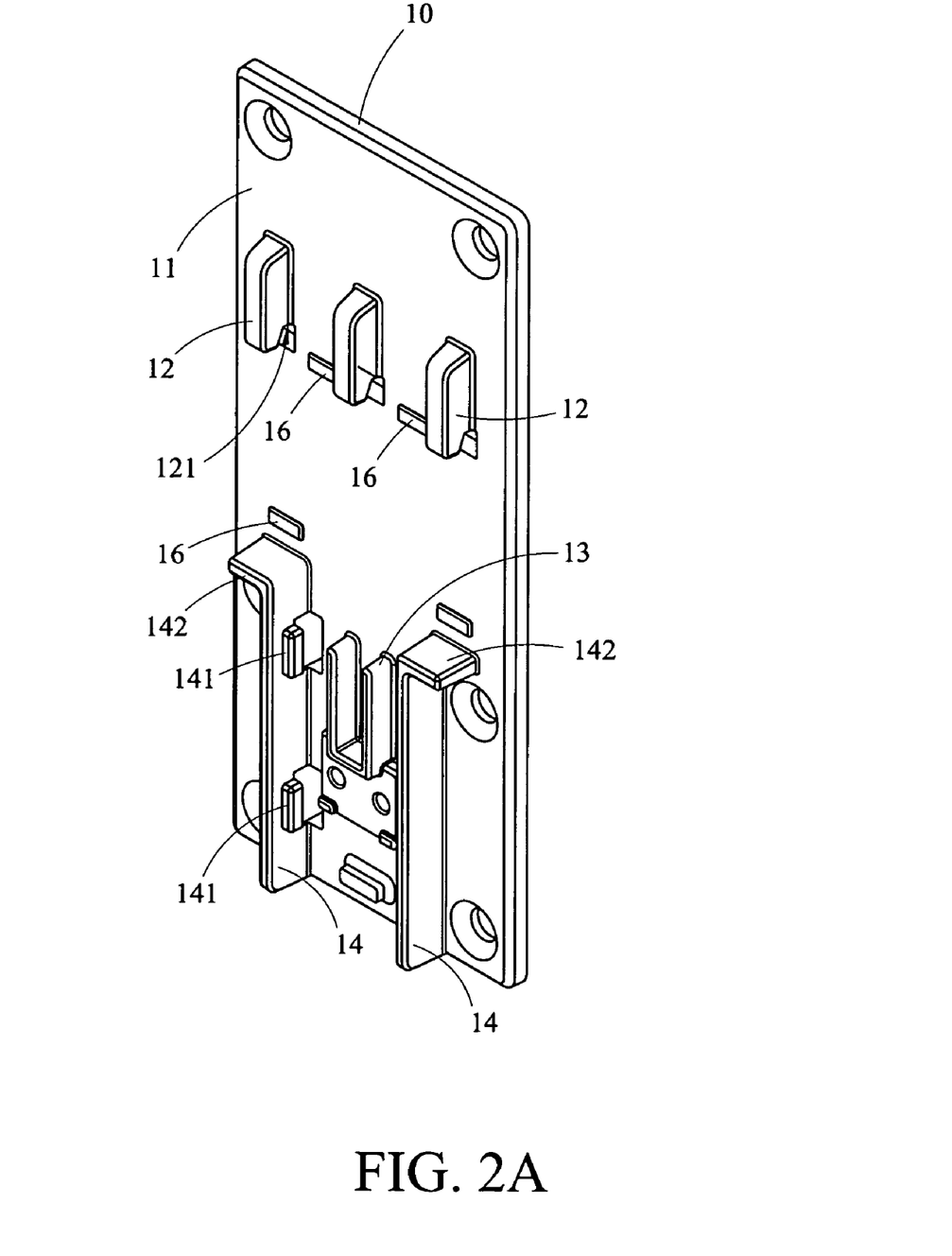
FIG. 2A is a three-dimensional structural view of a base of a clamping device for a DIN rail according to the present invention.

Then, the main elements of the clamping device for a DIN rail according to the present invention are respectively illustrated first. FIG. 2A is a three-dimensional structural view of a base of a clamping device for a DIN rail according to the present invention.

At least one first buckling component 12, a receiving recess 13, at least one base positioning component 14 are provided on a surface 11 of the base 10. The first buckling components 12 provided on the surface 11 of the base 10 are buckled to the first slide rail of the DIN rail. The manner for buckling the first buckling components 12 to the first slide rail of the DIN rail will be subsequently illustrated below in detail.

The base 10 further includes a base fastening component 15 for fixing the clamping device on an external electronic device (not shown), in which the clamping device may be fixed on the external electronic device through screwing, snapping, and buckling manners, and the like. Only common fixing manners are listed here, but the applications of the present invention are not limited thereto. Any of the current fixing techniques can be used as one of the fixing manners in the present invention, so that the external electronic device can be fixed on the DIN rail through the clamping device according to the present invention.

There are specifications for the width and thickness of the DIN rail in the industry, so that the first buckling components 12, the receiving recess 13, and the base positioning components 14 provided on the surface 11 of the base 10 need to be set according to the width of the DIN rail, i.e., the first buckling components 12 and the base positioning components 14 need to be disposed at the corresponding positions respectively, and the distance there-between is the width of the DIN rail. The thickness of a buckling portion 121 of the first buckling component 12 is a thickness of the first slide rail of the DIN rail.

However, considering the thickness of the DIN rail, there are mainly two kinds of thicknesses in the industrial specification, which are merely taken as examples, but not to limit the application of the present invention. The thickness of the DIN rail is 1.5 mm and 1.0 mm respectively. Therefore, the thickness of the buckling portion 121 of the first buckling component 12 should be designed as the greater thickness of the DIN rail, but as for the smaller thickness of the DIN rail, the buckling effect between the DIN rail and the first buckling components 12 is not as firm as the situation of the greater thickness of the DIN rail, so that it may be loosened. Therefore, at least one protruding portion 16 is disposed on the surface 11 where the first buckling components 12 are buckled to the first slide rail of the DIN rail. In this way, through the protruding portions 16, the DIN rail with the smaller thickness can be buckled with the first buckling components 12 firmly, which achieves the same positioning effect as the DIN rail with the greater thickness. The protruding portions 16 described above can be applied to the base 10 of the second slide rail of the DIN rail, which are not described in detail.

Then, the receiving recess 13 provided on the surface 11 of the base 10 is disposed between the base positioning components 14 for placing the elastic element 20 (shown in FIG. 1). The elastic element 20 is limited to act in a single direction.

At least one poisoning point 141 is further provided on each base positioning component 14. The positioning points 141 are used for positioning the sliding element 40 (referring to FIG. 1) when the sliding element 40 is assembled on the base 10. Each base positioning component 14 further includes a slide rail support component 142. When the clamping device according to the present invention is clamped to the DIN rail, the slide rail support components 142 can be used to support the DIN rail. Besides supporting the DIN rail, the slide rail support components 142 are also provided for disposing an external electronic device horizontally.

Figure 2B:
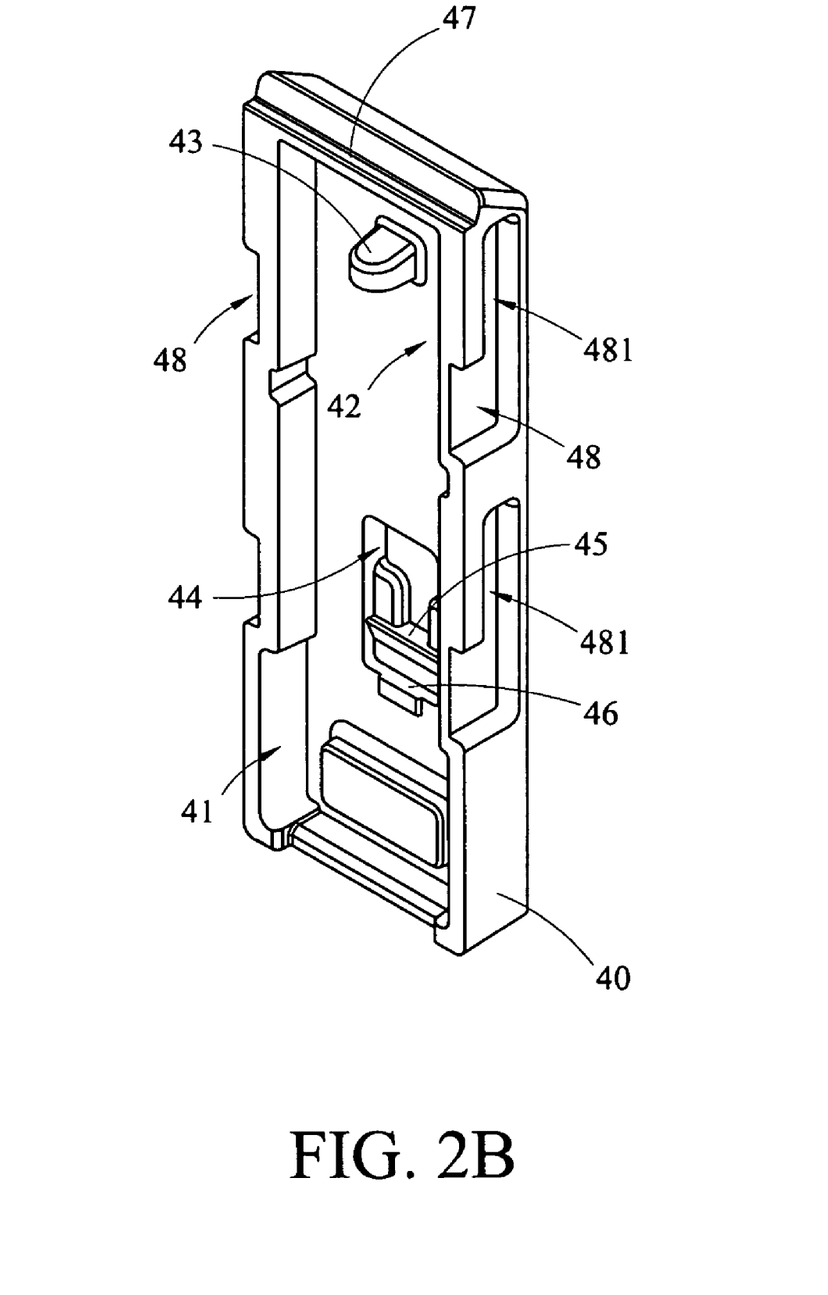
FIG. 2B is a three-dimensional structural view of a sliding element of a clamping device for a DIN rail according to the present invention.

Then, FIG. 2B is a three-dimensional structural view of a sliding element of a clamping device for a DIN rail according to the present invention.

The sliding element 40 has an inward depressed component 41. A support component 43 is provided at a bottom surface 42 of the depressed component 41. The support component 43 may be one of a solid body or a depressed body with a positioning groove, which is fitted with the elastic element 20 of the base 10 (shown in FIG. 1). The support component 43 made by the solid body may touch and support the elastic element 20 directly. When the support component 43 made by the depressed body with the positioning groove, the elastic element 20 is supported against in the positioning groove. Two kinds of the support components 43 are merely taken as examples here, but not to limit the application of the present invention. The motions and fitting manners between the support component 43 and the elastic element 20 are illustrated subsequently.

The sliding element 40 is further provided with a positioning hole 44 at the bottom surface 42 of the depressed component 41. A first positioning component 45 and a second positioning component 46 are provided at the positioning hole 44. The first positioning component 45 and the second positioning component 46 are fitted with the shape of the positioning blade spring 30 (shown in FIG. 1), such that the spring positioning component 31 (shown in FIG. 1) of the positioning blade spring 30 can be positioned with respect to the first positioning component 45 and the second positioning component 46 respectively. The fitting manner of the positioning blade spring 30 with respect to the first positioning component 45 and the second positioning component 46 is illustrated subsequently.

The sliding element 40 is provided with at least one second buckling component 47 and at least one fitting component 48 externally. The second buckling components 47 are disposed at a different side from the fitting components 48. The second buckling components 47 provided at an exterior of the sliding element 40 are buckled to the second slide rail of the DIN rail. The buckling manner between the second buckling component 47 and the DIN rail is illustrated in detail subsequently.

Referring to FIG. 2A, the fitting components 48 provided at an exterior of the sliding element 40 are fitted with the positioning points 141 provided on the base positioning components 14, such that the sliding element 40 can be assembled on the base 10 for positioning. In addition, each of the fitting components 48 has a slide groove 481. When the sliding element 40 is assembled to the positioning points 141 of the base positioning components 14, the sliding element 40 can slide relative to the base 10 through the slide grooves 481 of the fitting components 48.

The assembling process of the clamping device for a DIN rail according to the present invention will be illustrated below, which is demonstrated with reference to FIGS. 1 and 2B.

First, the elastic element 20 is allocated within the receiving recess 13 of the base 10, and the positioning blade spring 30 with the spring positioning component 31 is fixed on the base 10. As shown in the figures, the positioning blade spring 30 is fixed below the receiving recess 13, which is merely taken as an implementation aspect, but not to limit the present invention.

Then, since the thickness of the sliding element 40 is the same as that of the base positioning component 14 and the thickness of the depressed component 41 of the sliding element 40 is the same as that of the receiving recess 13, when the sliding element 40 is covered on the base 10, the receiving recess 13 is closely attached to the bottom surface 42 of the depressed component 41 of the sliding element 40. At this time, the positioning blade spring 30 is also covered within the depressed component 41 of the sliding element 40. The fitting components 48 provided at an exterior of the sliding element 40 correspond to the positioning points 141 provided on the base positioning component 14, such that the sliding element 40 can be allocated between the base positioning components 14 of the base 10. The first buckling components 12 of the base 10 are allocated corresponding to the second buckling components 47 provided at an exterior of the sliding element 40.

One end of the elastic element 20 just supports against the support component 43 disposed on the sliding element 40. In this state, the elastic element 20 is in an original state, i.e., the elastic element 20 does not generate an elastic recovery force. The positioning blade spring 30 is covered by the sliding element 40. Under the squeezing force of the sliding element 40, the positioning blade spring 30 produces the elastic recovery force in a direction opposite to the direction of the squeezing force.

The first positioning component 45 and the second positioning component 46 provided at the positioning hole 44 of the sliding element 40 are higher than the positioning blade spring 30 at this time. Then, the sliding element 40 moves along the slide grooves 481 of the fitting components 48, and when the positioning blade spring 30 relatively moves to the second positioning component 46, the spring positioning component 31 can be positioned to the second positioning component 46 under the elastic recovery force generated by the positioning blade spring 30.

At this time, due to the moving of the sliding element 40, the elastic element 30 supporting against the support component 43 of the sliding element 40 is exerted with the squeezing force from the support component 43, thereby naturally generating the elastic recovery force. The elastic recovery force generated by the elastic element 30 is the clamping force of the clamping mechanism in the present invention.

In addition, when the spring positioning component 31 is positioned to the second positioning component 46, since the sliding element 40 is longer than the base positioning component 14, the sliding element 40 protrudes out of the base 10, and the protruding portion of the sliding element 40 is the portion that can be operated by the user. Each second buckling component of the sliding element 40 protrudes out of the corresponding slide rail support component 142 of the base positioning component 14.

Figure 3:
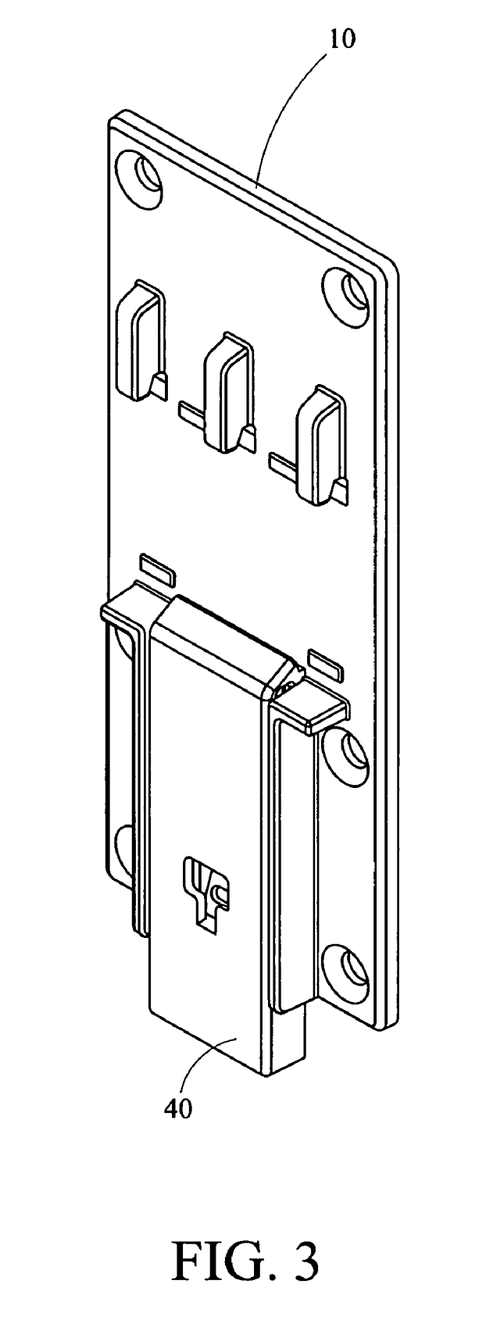
FIG. 3 is a three-dimensional assembly view of a clamping device for a DIN rail according to the present invention.

Under a fixing force generated by positioning the spring positioning component 31 at the second positioning component 46, the sliding element 40 can be assembled on the base 10. The clamping device after being assembled is shown in FIG. 3, and FIG. 3 is a three-dimensional assembly view of a clamping device for a DIN rail according to the present invention.

Figure 4A:
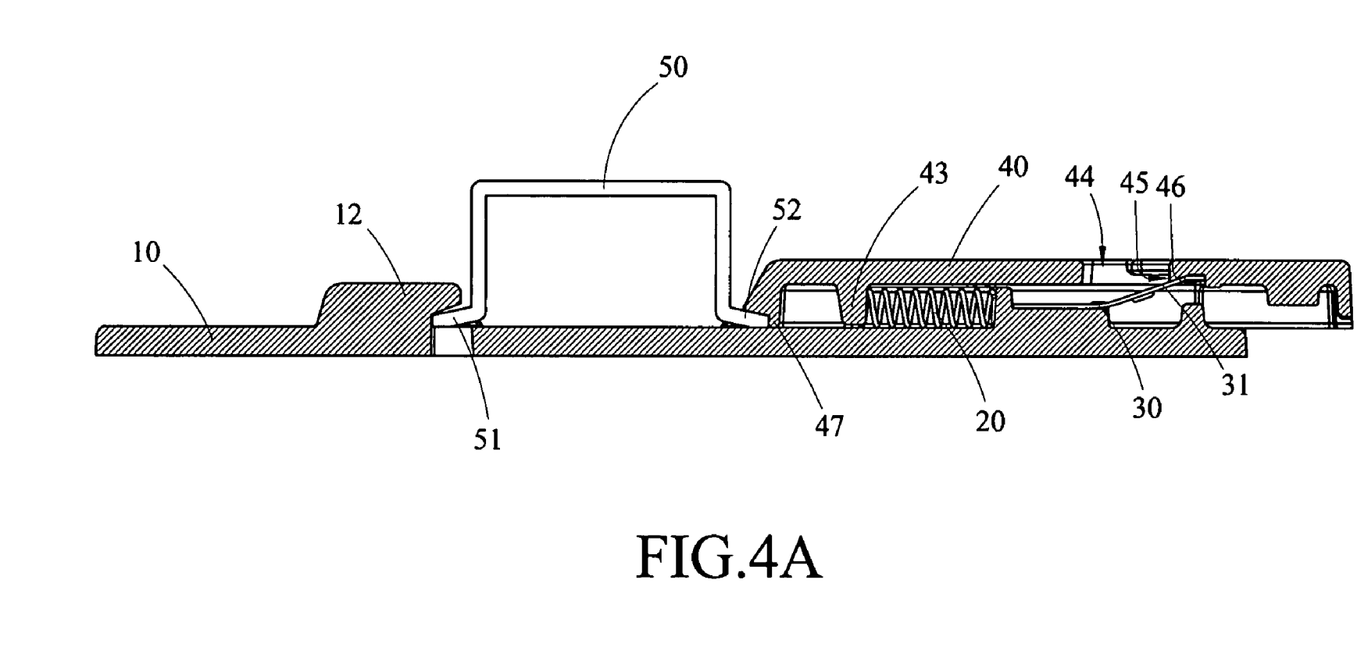
FIG. 4A is a schematic sectional view of a clamping device for a DIN rail according to the present invention when clamping the DIN rail.

Then, the operations of the clamping device for a DIN rail according to the present invention when clamping the DIN rail are illustrated. FIG. 4A is a schematic sectional view of a clamping device for a DIN rail according to the present invention when clamping the DIN rail.

First, the first buckling components 12 of the base 10 are buckled to the first slide rail 51 of the DIN rail 50. Taking the place where the first buckling components 12 are buckled to the first slide rail 51 as a rotating axis, the clamping device is rotated, such that the second slide rail 52 of the DIN rail 50 contacts the sliding element 40, so as to produce a contact pressure for squeezing the sliding element 40.

At this time, the support component 43 within the sliding element 40 is squeezed under the contact pressure, and in turn squeezes the elastic element 20, such that the elastic recovery force of the elastic element 20 increases, i.e., the clamping force increases. When the second slide rail 52 of the DIN rail 50 is buckled with the second buckling components 47 of the sliding element 40, the clamping device can be fixed on the DIN rail 50 with a considerable clamping force.

Figure 5:
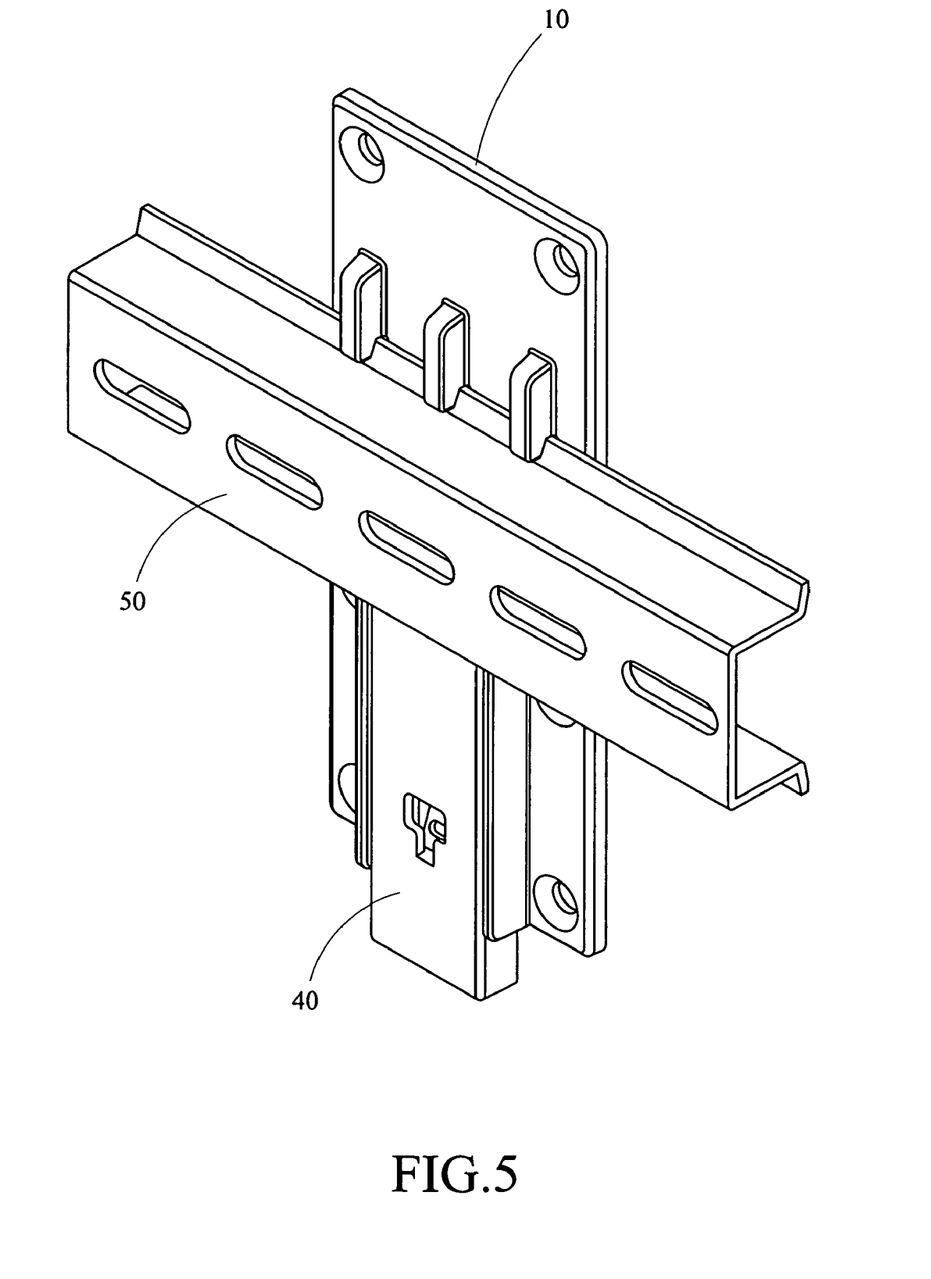
FIG. 5 is a three-dimensional assembly view of a clamping device for a DIN rail according to the present invention when clamping the DIN rail.

The results of the clamping device when clamping the DIN rail can be obtained with reference to FIG. 5, and FIG. 5 is a three-dimensional assembly view of a clamping device for a DIN rail according to the present invention when clamping the DIN rail.

Figure 4B:
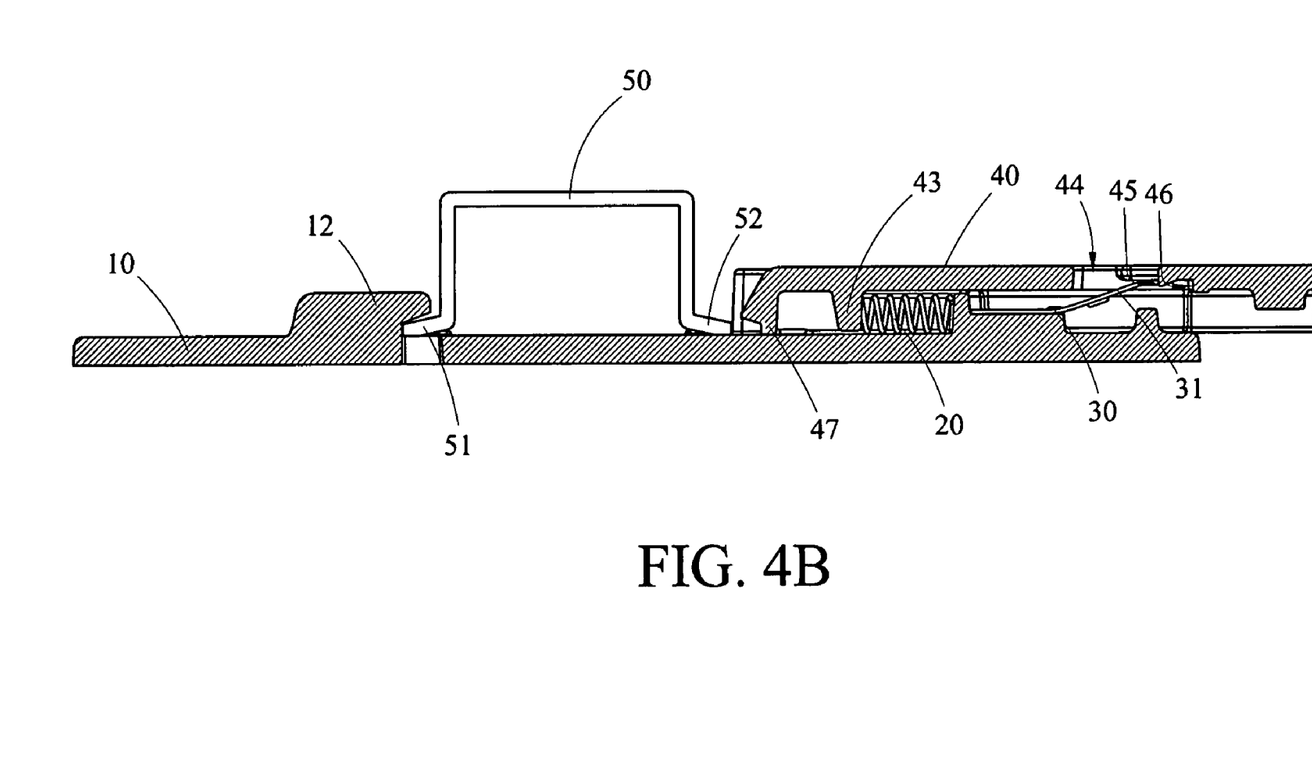
FIG. 4B is a schematic sectional view of a clamping device for a DIN rail according to the present invention when unclamping the DIN rail.

Then, FIG. 4B is a schematic sectional view of a clamping device for a DIN rail according to the present invention when unclamping the DIN rail.

When unclamping the clamping device from the DIN rail 50, the user needs to pull the portion of the sliding element 40 protruding from the base 10, and at this time, the support component 43 within the sliding element 40 squeezes the elastic element 20 again. The spring positioning component 31 of the positioning blade spring 30 starts to move relatively due to the moving of the sliding element 40, i.e., starts to move from the first positioning component 45.

When the spring positioning component 31 of the positioning blade spring 30 moves relatively from the second positioning component 46 to the first positioning component 45, the spring positioning component 31 of the positioning blade spring 30 can be positioned and fixed to the first positioning component 45 through the elastic recovery force of the positioning blade spring 30 itself. At this time, as shown in the figures, it can be seen clearly that, the second buckling components 47 have been released from the buckling state completely, and the user can unclamp the clamping device from the DIN rail.

When it needs to recover the spring positioning component 31 of the positioning blade spring 30 from the first positioning component 45 to the second positioning component 46 again, the user can apply an external force to the positioning blade spring 30 through the positioning hole 44 of the sliding element 40. When the external force applied to the positioning blade spring 30 is sufficient for releasing the spring positioning component 31 of the positioning blade spring 30 from a fixing state at the first positioning component 45, the sliding element 40 can be returned to the original state (shown in FIG. 3) rapidly under the respective elastic recovery force of the elastic element 20 and the positioning blade spring 30.

Since an external force needs to be applied to the spring positioning component 31 of the positioning blade spring 30, referring to FIG. 1 again, a notch component 311 is provided at the spring positioning component 31 of the positioning blade spring 30. With the notch component 311 provided at the spring positioning component 31 of the positioning blade spring 30, the external force applied to the positioning blade spring 30 can be concentrated on the notch component 311. In addition, the notch component 311 can enhance the structure strength of the spring positioning component 31, so as to prevent the spring positioning component 31 from being deformed due to the external force.

A limit component 17 may be further disposed on the base 10 of the spring positioning component 31 of the corresponding positioning blade spring 30 to limit a moving range of the spring positioning component 31 of the positioning blade spring 30, so as to avoid applying an excessively large force to make the spring positioning component 31 of the positioning blade spring 30 lose the elasticity due to elastic fatigue.

To sum up, the difference between the present invention and the prior art lies in that, by means of fixing the positioning blade spring on the base, providing the first positioning component and the second positioning component on the sliding element, and moving the sliding element relative to the base, the positioning blade spring is enabled to move from the second positioning component to the first positioning component in the present invention, such that the user can get to know that the clamping device is disengaged with the DIN rail completely, i.e., the clamping device can be detached from the DIN rail, thereby simplifying the detaching process and being helpful for the user to detach the clamping device from the DIN rail.

With the technique means described above, the problems of the prior art that the clamping device cannot be easily detached from the DIN rail and is easily damaged can be solved, thereby achieving the technique efficacies of simplifying the process of detaching the clamping device from the DIN rail and facilitating detaching the clamping device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A clamping device for a DIN rail, adapted to be fixed on a DIN rail having a first slide rail and a second slide rail, the clamping device comprising:
    a base comprising at least one first buckling component, a receiving recess, and at least one base positioning component, wherein the at least one first buckling component is buckled on the first slide rail;
    an elastic element, allocated in the receiving recess;
    a positioning blade spring, having a spring positioning component, and fixed on the base, and
    a sliding element, having an inward depressed component, wherein a support component and a positioning hole are provided at a bottom surface of the depressed component, a first positioning component and a second positioning component are provided at the positioning hole, the depressed component is provided with at least one second buckling component and at least one fitting component externally, the at least one fitting component having a slide groove, and the at least one second buckling component is buckled to the second slide rail;
    wherein when the sliding element is positioned on the base, the at least one fitting component is positioned corresponding to the at least one base positioning component, the spring positioning component is positioned corresponding to the second positioning component, the elastic element bears against the support component to produce a clamping force, the sliding element slides relative to the base through the slide groove, and when the sliding element slides relative to the base, the spring positioning component moves from the second positioning component to the first positioning component for being positioned.

2. The clamping device for a DIN rail as claimed in claim 1, wherein the base further comprises at least one base fastening component for fixing the clamping device to an external electronic device.

3. The clamping device for a DIN rail as clamed in claim 1, wherein the base further comprises at least one protruding portion for fitting with DIN rails with different specifications.

4. The clamping device for a DIN rail as clamed in claim 3, wherein the protruding portions are located on the base where the at least one first buckling component is buckled to the first slide rail and the at least one second buckling component is buckled to the second slide rail.

5. The clamping device for a DIN rail as clamed in claim 1, wherein the base further comprises a limit component, for limiting a moving range of the spring positioning component.

6. The clamping device for a DIN rail as claimed in claim 1, wherein the at least one base positioning component further comprises a slide rail support component.

7. The clamping device for a DIN rail as clamed in claim 6, wherein the at least one second buckling component protrudes out of the slide rail support component.

8. The clamping device for a DIN rail as claimed in claim 1, wherein the at least one base positioning component further comprises at least one positioning point.

9. The clamping device for a DIN rail as claimed in claim 1, wherein a length of the sliding element is greater than that of the at least one base positioning component.

10. The clamping device for a DIN rail as clamed in claim 1, wherein a thickness of the sliding element is the same as that of the at least one base positioning component.

11. The clamping device for a DIN rail as claimed in claim 1, wherein a thickness of the receiving recess is the same as a depressed thickness of the depressed component.

12. The clamping device for a DIN rail as claimed in claim 1, wherein the positioning blade spring is provided with a notch component at the spring positioning component thereof to enhance a structure strength of the spring positioning component.

13. The clamping device for a DIN rail as clamed in claim 1, wherein the support component is selected from one of a solid body or a depressed body with a positioning groove.

14. The clamping device for a DIN rail as clamed in claim 13, wherein the elastic element is supported against the positioning groove.

* * * * *